United States Patent [19]
Nitschke et al.

[11] Patent Number: 5,101,115
[45] Date of Patent: Mar. 31, 1992

[54] EVALUATION PROCESS AND EVALUATION DEVICE FOR SENSOR OUTPUT SIGNALS

[75] Inventors: Werner Nitschke, Ditzingen; Wolfgang Drobny, Besigheim; Hugo Weller, Oberriexingen; Peter Taufer, Renningen, all of Fed. Rep. of Germany

[73] Assignee: Robert Bosch GmbH, Stuttgart, Fed. Rep. of Germany

[21] Appl. No.: 409,111

[22] Filed: Sep. 19, 1989

[63] Continuation-in-part of PCT/DE89/00549, Aug. 23, 1989.

[30] Foreign Application Priority Data

Sep. 2, 1988 [DE] Fed. Rep. of Germany ....... 3829784

[51] Int. Cl.$^5$ .............................................. B60R 21/32
[52] U.S. Cl. ..............:.................. 307/10.1; 280/735
[58] Field of Search ................ 307/9.1, 10.1; 280/734, 280/735, 801

[56] References Cited
U.S. PATENT DOCUMENTS

| | | | |
|---|---|---|---|
| 3,701,903 | 10/1972 | Merhar | 307/9 |
| 4,477,732 | 10/1984 | Mausner | 307/9 |
| 4,835,513 | 5/1989 | McCurdy et al. | 340/438 |
| 4,836,024 | 6/1989 | Woehrl et al. | 307/10.1 |
| 4,851,705 | 7/1989 | Musser et al. | 307/10.1 |
| 4,873,452 | 10/1989 | Morota et al. | 307/10.1 |
| 4,893,109 | 1/1990 | Vrabel et al. | 307/10.1 |
| 4,896,741 | 1/1990 | Kawai et al. | 307/10.1 |
| 4,950,915 | 8/1990 | Spies et al. | 307/9.1 |
| 4,958,851 | 9/1990 | Behr et al. | 280/735 |

Primary Examiner—A. D. Pellinen
Assistant Examiner—Jeffrey A. Caffin
Attorney, Agent, or Firm—Kenyon & Kenyon

[57] ABSTRACT

In an evaluation process for output signals of an acceleration-sensitive sensor in restraint systems for vehicle occupants, the output signals of the sensor are picked up and evaluated periodically. In a normal, uncritical operating state the evaluation occurs after relatively long intervals of time. If indications suggest a critical operating state, that is, an accident, however the evaluation of the output signals of the sensor occurs at shorter intervals of time.

6 Claims, 7 Drawing Sheets ns.
EVALUATION PROCESS AND EVALUATION DEVICE FOR SENSOR OUTPUT SIGNALS This is a continuation-in-part application of International Application No. PCT/DE89/00549 filed Aug. 23, 1989.

FIELD OF THE INVENTION

The present invention relates to methods and apparatus for protecting the occupants of motor vehicles and, in particular, to methods and apparatus for controlling the release of passenger restraint systems based on the signals generated by acceleration sensors.

PRIOR ART

From U.S. Pat. No. 3,701,903 an evaluation process for output signals of an acceleration-sensitive sensor in restraint systems for vehicle occupants is known, in which the sensor output signals are integrated after an amplitude limitation, and which triggers an output stage when the integrated value exceeds a threshold.

ADVANTAGES OF THE INVENTION

The process according to the invention has the advantage that very large data quantities can be picked up and processed reliably and that while false releases are avoided, a reliable and timely activation of the restraint systems in an emergency takes place.

BRIEF DESCRIPTION OF THE DRAWINGS

Embodiments of the invention are illustrated in the drawings and explained more specifically in the following description.

DESCRIPTION OF THE PREFERRED EMBODIMENTS

Figure 1:
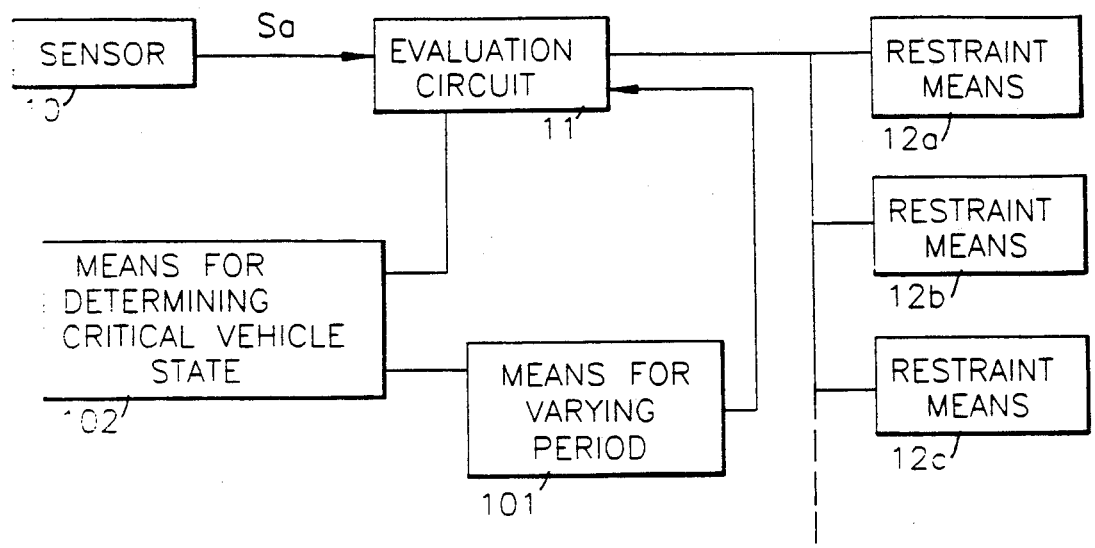
FIGS. 1 to 4 show block diagrams of evaluation devices for sensor output signals for carrying out the process according to the invention in connection with restraint systems for vehicle occupants.

A first block diagram of an evaluation device for sensor output signals in connection with restraint systems for vehicle occupants is illustrated in FIG. 1. The restraint system comprises at least one acceleration-sensitive sensor 10 which is connected to a first input of an evaluation circuit 11 for pickup and evaluation of the output signal Sa delivered by the sensor 10. Connected to a first output of the evaluation circuit 11 are several restraint means 12a, 12b, 12c, which may be inflatable air bags and/or strap tighteners. Connected to a second output of the evaluation circuit 11 are means 102 for pickup of a critical vehicle state, such as an accident situation. The means 102 may alternatively be an integral part of the evaluation circuit 11 itself. Connected to the output of the means 102 is an input of means 101 for varying the period duration between the evaluations of the output signal Sa, the output terminal of which leads to a second input of the evaluation circuit 11.

Figure 2:
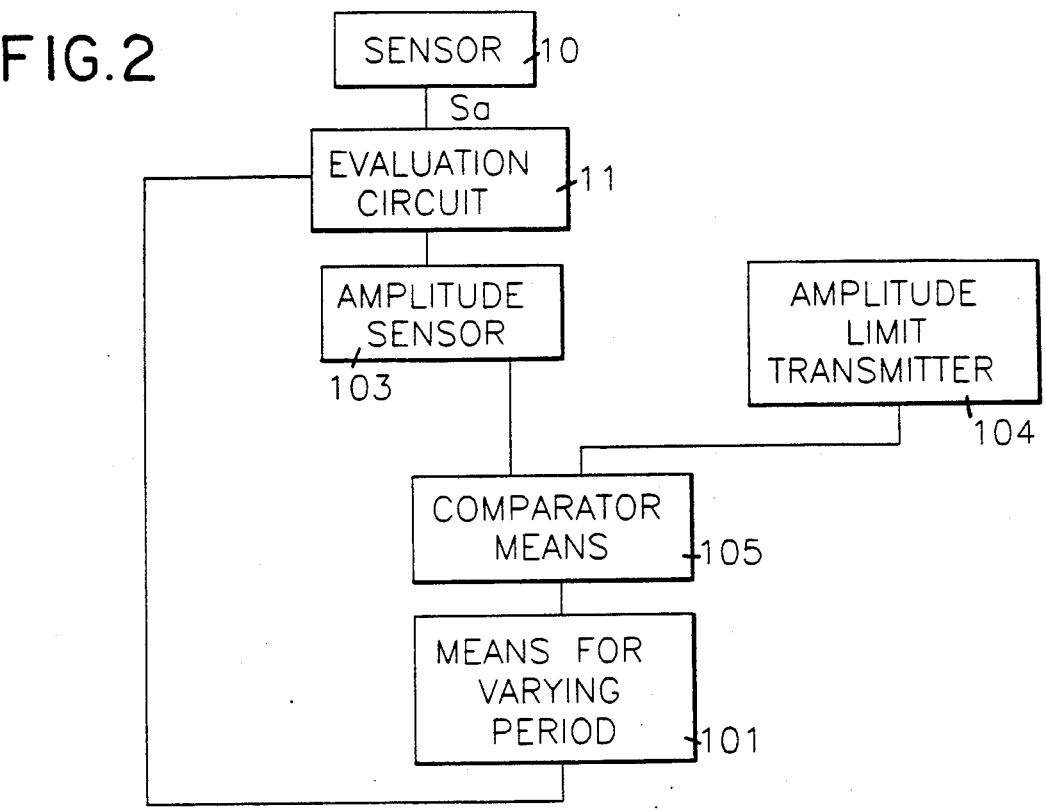

In the embodiment according to FIG. 2, the output of the evaluation circuit 11 is connected to the input terminal of means 103 for pickup of the amplitude values of the output signals Sa of sensor 10, the output terminal of which leads to a first input terminal of comparator means 105. An amplitude limit transmitter 104 is connected to a second input terminal of the comparator means 105. The output of the comparator means 105 is in turn connected to the input terminal of the means 101 for varying the period duration, the output terminal of which leads to an input of the evaluation circuit 11.

Figure 3:
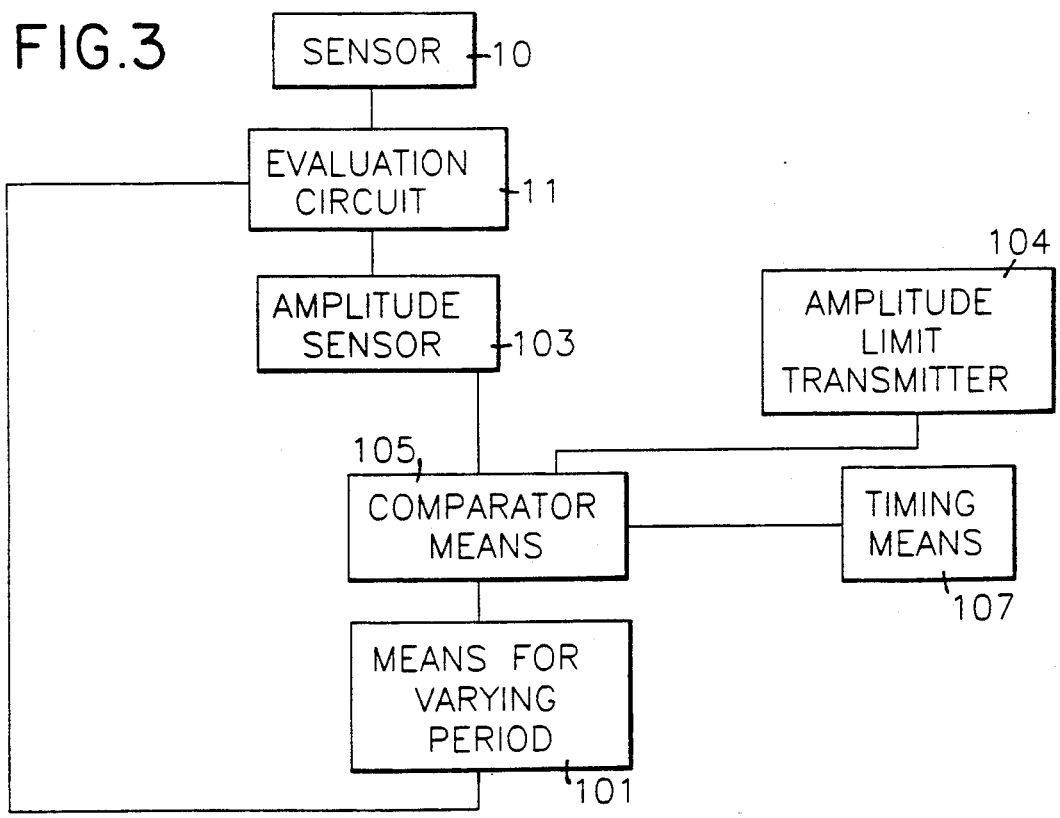

In the embodiment according to FIG. 3, timing means 107 are additionally provided which are connected to a third input of the comparator means 105.

Figure 4:
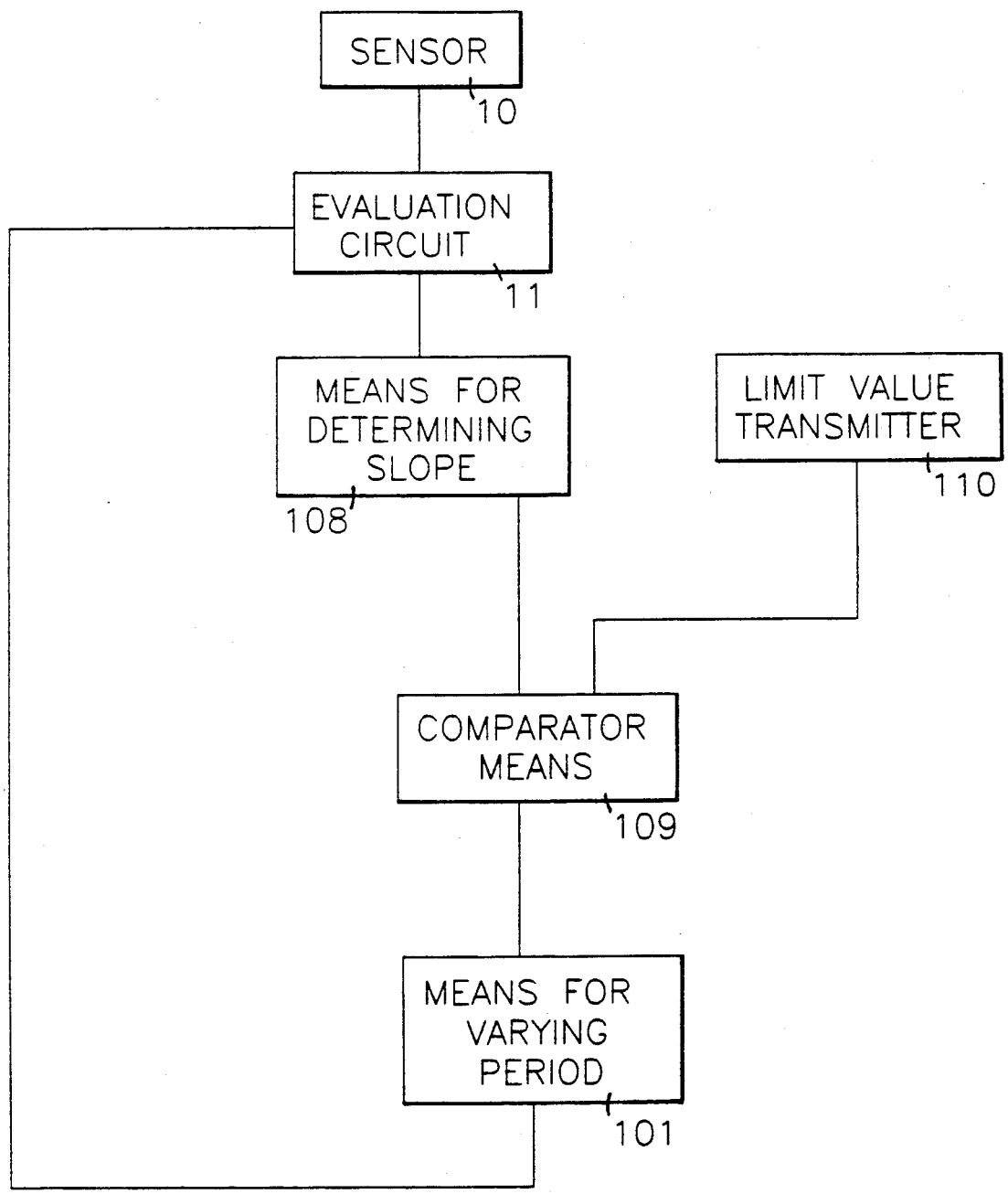

In the embodiment according to FIG. 4, an output terminal of the evaluation circuit 11 leads to the input terminal of means 108 for pickup of the slope of the tangent to the output signal Sa of sensor 10. The output terminal of the means 108 leads to a first input terminal of comparator means 109 whose second input terminal is connected to a limit value transmitter 110 for determining the slope value of the tangent. The output terminal of the comparator means 109 leads in turn to the input terminal of the means 101 for varying the period duration.

Figure 5:
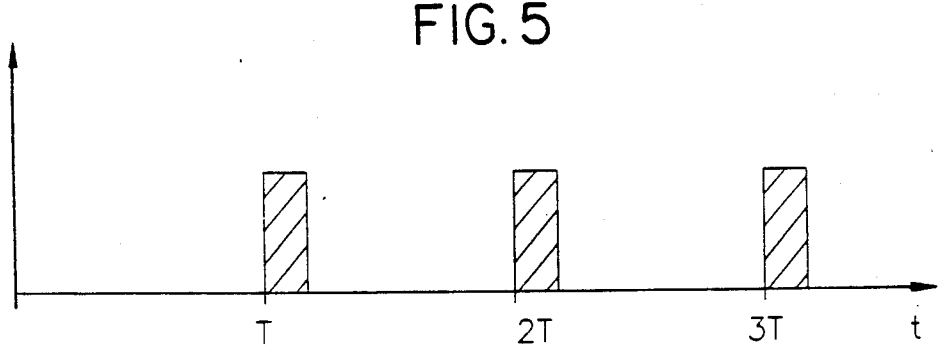
FIG. 5 illustrates a first pulse diagram.
Figure 10:
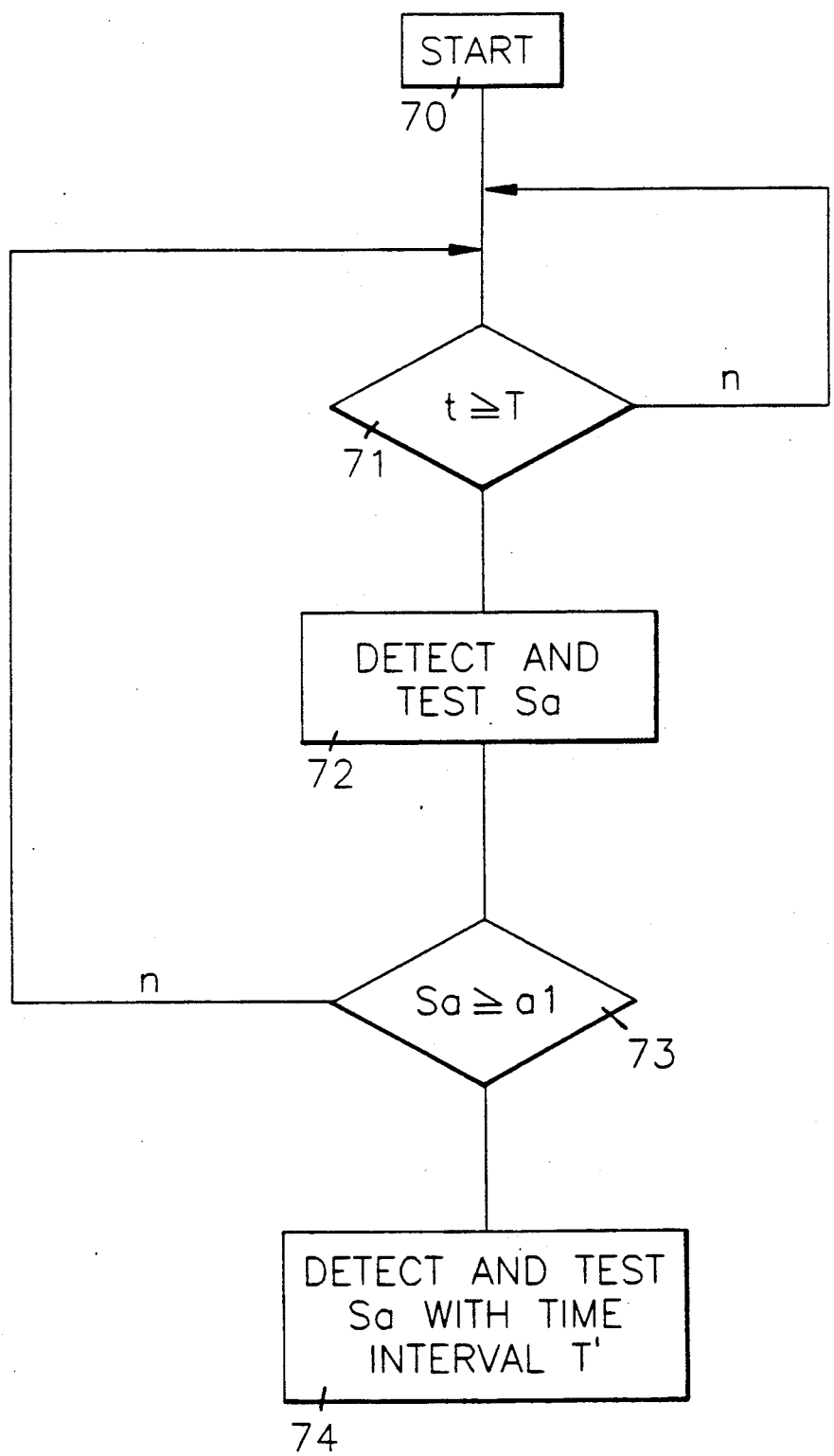
FIG. 10, FIG. 11 and FIG. 12 are sequence diagrams illustrating the program flow for different embodiments of the invention.
Figure 11:
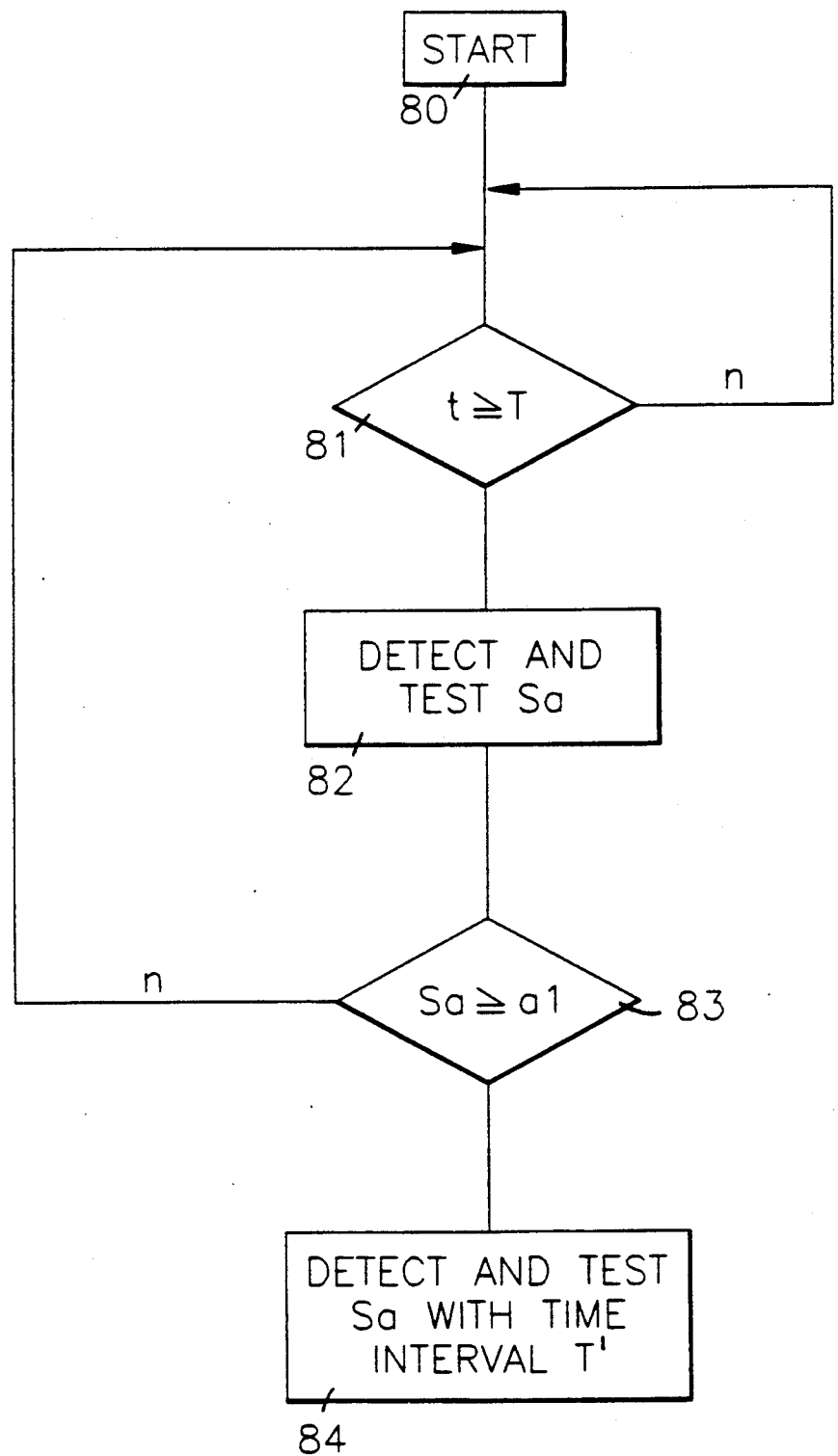

Under the action of an acceleration on the vehicle, the acceleration-sensitive sensor 10 delivers an output signal Sa, which is preferably proportional to the acceleration of the vehicle, and which is picked up and evaluated by the evaluation circuit 11 and means 102, to determine whether an accident situation exists. An accident situation (crash) which could become dangerous for the vehicle occupants announces itself, for example, by the fact that the acceleration acting on the vehicle exceeds a certain limit value. When the evaluation circuit 11 recognizes such an accident situation by evaluation of the output signal Sa of sensor 10, the restraint means 12a, 12b, 12c are activated by the evaluation circuit, to protect the vehicle occupants. Evaluation circuits 11 according to the latest state of development comprise digital signal processing means, e.g., digital computers, which reprocess the output signal Sa delivered by sensor 10 and present in analog form, after the signals are converted to digital form. Since in signal processing extremely large quantities of data occur, but as a rule only a computer of limited capacity is available, it is desirable to pick up and reprocess the output signals Sa of sensor 10, not continuously, but after relatively long intervals of time T, 2T, 3T. Then, a large portion of the existing computer capacity can be made available exclusively for the pickup and evaluation of the sensor output signals Sa, while in the intervening periods, i.e. in which no sensor signal is being evaluated, the free computer capacity is available for other purposes, e.g., for the checking of all components of the restraint system. This mode of operation is characteristic of a noncritical operating state of the restraint system when there is no emergency situation. This mode of operation is explained schematically by the pulse diagram illustrated in FIG. 5. After each relatively long interval of time T, 2T, 3T, a pickup and evaluation process of the sensor output signal Sa is carried out, which takes a certain amount of time, indicated by the hatched bars of the pulse diagram. During the time intervals not taken up by the hatched bars, the total computer capacity is available for other purposes. But, as soon as the sensor output signal Sa indicates a critical operating state of the restraint system based on parameters to be further explained below, e.g. an emergency situation leading to an accident, the pickup and evaluation of the sensor output signal Sa is carried out at shorter intervals of time T', 2T', 3T', to be able to evaluate the data as up to date as possible. Accordingly, the existing computer capacity is made available to a greater degree as compared with the normal situation, for evaluating the sensor output signal Sa. This mode of operation of the restraint system is illustrated schematically with reference to the pulse diagram of FIG. 6. At time t=0, for example, when the motor vehicle equipped with the restraint system is started, the restraint system is assumed to be taken into operation. At the end of a first interval T, a pickup and evaluation process of the output signal Sa of sensor 10 is carried out, exactly as in the representation of FIG. 5, indicated by a bar shown in simple oblique hatching. During this evaluation process it is recognized, based on certain parameters, that a critical operating state looms ahead and an accident threatens to occur. Therefore, for better pickup and evaluation of the output signal Sa of sensor 10 relevant to the restraint means 12a, 12b, 12c, the output signals Sa are picked up and evaluated at shorter intervals T', 2T', 3T'. The evaluation times after these shorter intervals are marked by the double-hatched bars of the pulse diagram of FIG. 6. In a first embodiment of the invention, the amplitude of the output signal Sa of sensor 10 is evaluated as the critical parameter, according to FIG. 7. If, for example, on the occasion of the pickup and evaluation of the sensor output signal Sa occurring after interval T, it is detected by the evaluation circuit 11 that the sensor output signal Sa exceeds a preset amplitude a1, the subsequent evaluation and pickup of the sensor output signal Sa is carried out after shorter intervals T', 2T', 3T'. The amplitude of the sensor output signal Sa exceeding the preset limit value a1 is, in fact, an indication that a crash situation is at hand, marked by a strong acceleration stress on the vehicle. The sequence diagram of FIG. 10 serves to explain this embodiment of the invention further. In program step 70, which corresponds to time t=0 of FIG. 6, the restraint system is activated by starting the vehicle. In program step 71 a time interval is monitored, establishing whether the end of interval T has been reached. When T has been reached, pickup and evaluation of the sensor output signal Sa begins in step 72. Then, in step 73, if it is found that the amplitude of the sensor output signal Sa has exceeded the preset limit value a1, pickup and evaluation is carried out after shorter time segments T', 2T', 3T' in step 74. It may then happen, however, that due to a disturbance of only short duration, the amplitude of the sensor output signal Sa exceeds the limit value a1 even though an emergency situation does not exist. This adverse situation is overcome by a second embodiment of the invention, which is hereinafter described with reference to FIG. 8 and the sequence diagram of FIG. 11.

Figure 8:
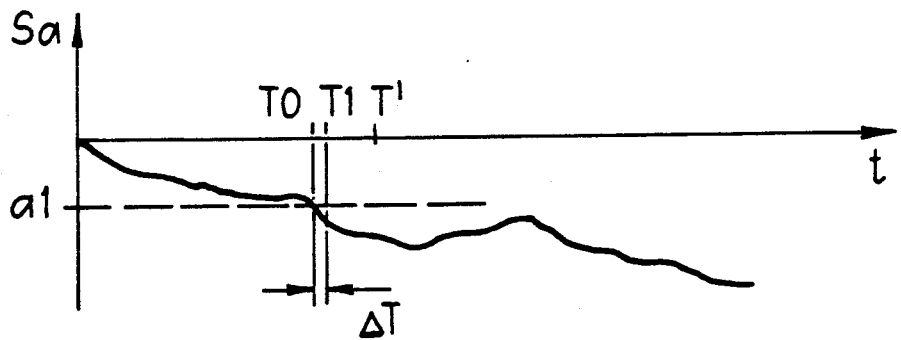

FIG. 8 shows again the representation of the sensor output signal Sa as a function of time t. Again, a limit value a1 is preset, and upon pickup and evaluation of the sensor output signal Sa, starting at time T, it is established whether the amplitude of the sensor output signal Sa exceeds this limit value a1. In the diagram of FIG. 8, the limit value a1 is exceeded at time T0. This further embodiment of the invention is not limited merely to monitoring the amplitude of the sensor output signal Sa and checking whether the amplitude of this signal exceeds the limit value a1, but provides for additional time monitoring and checks whether the time during which the limit value a1 is exceeded lasts at least for an interval $\Delta T = T0 - T1$ which, therefore, begins at time T0. Only if this is the case, that is, if the amplitude of the sensor output signal Sa exceeds the limit value a1 longer than the preset time interval $\Delta T$, the pickup and evaluation of the sensor output signal Sa is carried out at shorter intervals T', 2T', 3T. In this manner it is assured that brief, rather accidental overshoots of the limit value a1 by the amplitude of the sensor output signal Sa will not lead to a change of the normal evaluation program. The program in this second embodiment is evident also from the program steps 80 to 84 shown in FIG. 11.

Figure 6:
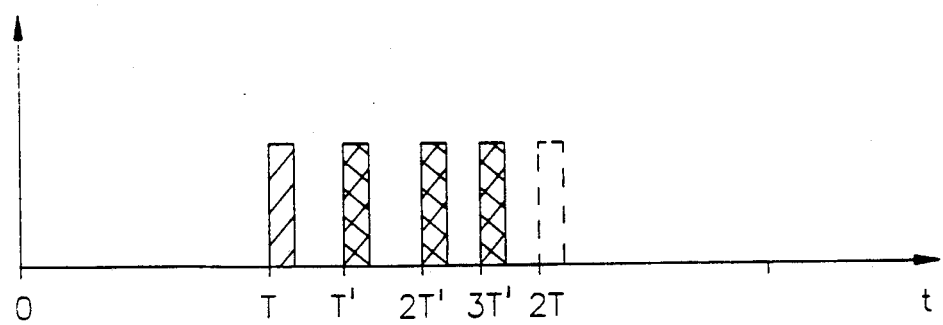
FIG. 6 illustrates a second pulse diagram.
Figure 7:
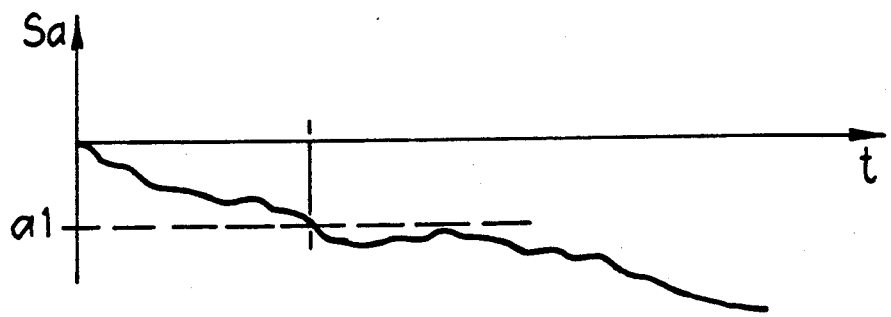
FIG. 7, FIG. 8 and FIG. 9 are graphic representations of the sensor output signal as a function of time.
Figure 9:
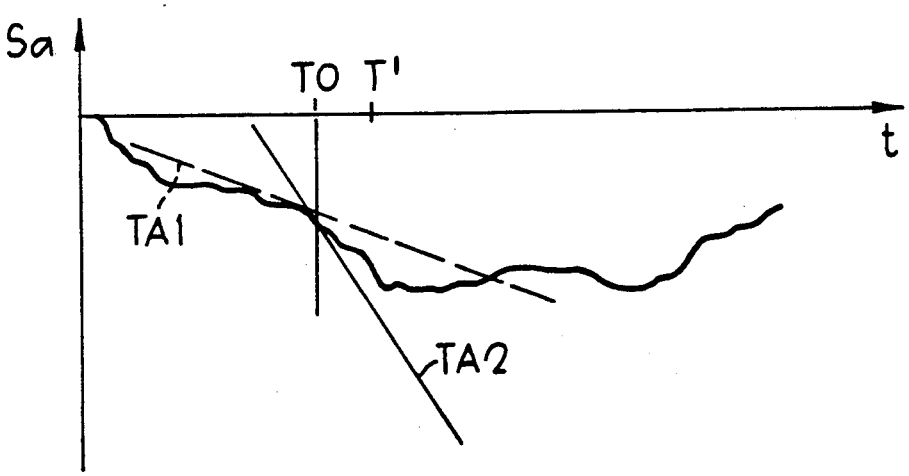
Figure 12:
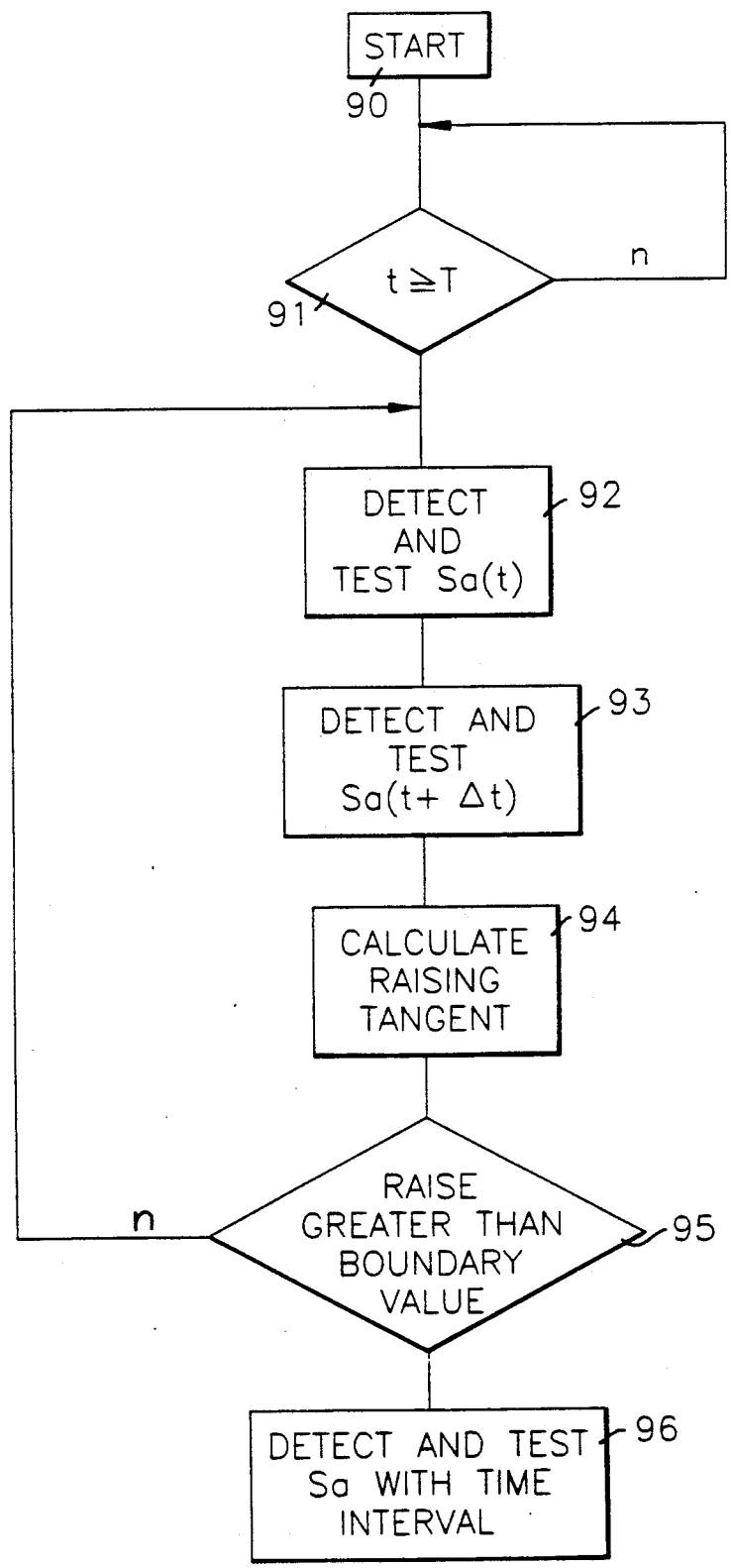

In a further embodiment of the invention hereinafter described with reference to FIGS. 9 and 12, it is checked upon pickup and evaluation of the sensor output signal Sa whether the slope of the tangent TA1, TA2 to the curve of the sensor output signal Sa exceeds a preset limit value. A steep tangent suggests a rapid amplitude change of the output signal Sa of sensor 10 and indicates a trend toward an amplitude increase, which is an indication of a strong acceleration stress on the vehicle. From the representation of FIG. 9 it is evident that at time T0 the tangent TA2 on the curve of the sensor output signal Sa is much steeper, i.e. slopes more than the tangent TA1 placed on the curve Sa at an earlier time. The slope of tangent TA2 exceeds a given limit value and, thus, the, presence of a critical operating state is inferred. The pickup and evaluation of the sensor output signal Sa is therefore carried out at shorter intervals T', 2T', 3T', as shown in FIG. 6. As is evident from the flow chart of FIG. 12, which explains this third embodiment, the slope of tangent TA can be determined in a relatively simple manner by known mathematical methods by forming a difference quotient, wherein the difference between successive function values of the sensor output signal Sa is divided by the difference between correlating abscissa values (time t).

If necessary, in further more complex embodiments of the invention, a combination of the above described parameters may be chosen, to find a criterion for changing the pickup and evaluation interval of the sensor output signal Sa.

We claim:

1. A method for controlling the release of a passenger restraint system in a motor vehicle comprising the following steps:
   generating signals indicative of the acceleration of the motor vehicle;
   measuring first time intervals, and comparing the acceleration signals or values indicative thereof to a threshold value upon expiration of each first time interval, the threshold value being indicative of a critical operating state of the motor vehicle; and
   if the acceleration signals exceed the threshold value, measuring second time intervals which are shorter than the first time intervals, and evaluating the acceleration signals upon expiration of each second time interval to facilitate the quick release of the passenger restraint system in response to a vehicle collision.

2. A method as defined in claim 1, further comprising the following steps:
   measuring the time that the acceleration signals exceed the threshold value and comparing the measured time to a predetermined time interval, and if the measured time exceeds the predetermined time interval, measuring the second time intervals which are shorter than the first time intervals, and evaluating the acceleration signals upon expiration of each second time interval.

3. A method as defined in claim 1, wherein the acceleration signals are based on the slope of the tangent to the point marking the expiration of the respective time interval on a curve of the acceleration signals with respect to time, wherein the greater the slope, the greater is the deceleration of the motor vehicle.

4. An apparatus for controlling the release of a passenger restraint system in a motor vehicle, comprising:
at least one acceleration sensor adapted to be mounted on a motor vehicle and to generate output signals indicative of the acceleration of the motor vehicle;
an evaluating unit coupled to the acceleration sensor for evaluating the acceleration signals and controlling the release of the passenger restraint system in response thereto; and
a timing unit adapted to measure first time intervals and to transmit evaluation signals indicative of the expiration of each first time interval to the evaluating unit, the evaluating unit being adapted to evaluate the acceleration signals in response to the evaluation signals, the timing unit being further adapted to measure second time intervals in response to detecting a critical operating state of the motor vehicle, the critical operating state being based on the value of the acceleration signals exceeding a predetermined value, and to transmit evaluation signals indicative of the expiration of each second time interval to the evaluating unit, the second time intervals being shorter than the first time intervals, the evaluating unit thus being adapted to more frequently evaluate the acceleration signals and, thus, facilitate the quick release of the passenger restraint system when the vehicle is operating in a critical state.

5. An apparatus as defined in claim 4, further comprising:
first means coupled to the evaluating unit for measuring the amplitude of the acceleration signals; and
second means coupled to the first means for comparing the amplitude to a threshold amplitude value and for transmitting an alarm signal to the timing unit in response to the amplitude exceeding the threshold value, the timing unit being responsive to the alarm signal to measure the second time intervals and to transmit the evaluation signals to the evaluating unit in response to the expiration of the second time intervals.

6. An apparatus as defined in claim 5, wherein the evaluating unit is adapted to calculate the slope of the tangent to the point marking the expiration of the respective time interval on a curve of the acceleration signals with respect to time, wherein the greater the slope, the greater is the deceleration of the motor vehicle, and to control the release of the passenger restraint system based thereon.

* * * * *

UNITED STATES PATENT AND TRADEMARK OFFICE
CERTIFICATE OF CORRECTION

PATENT NO. : 5,101,115

DATED : March 31, 1992

INVENTOR(S) : W. NITSCHKE, et al.

It is certified that error appears in the above-identified patent and that said Letters Patent is hereby corrected as shown below:

Column 6, line 22, change "5" to --$4_{(12)}$--.

Signed and Sealed this

Twenty-fourth Day of August, 1993

Attest:

BRUCE LEHMAN

Attesting Officer     Commissioner of Patents and Trademarks